United States Patent
Zhao et al.

(10) Patent No.: US 9,577,764 B2
(45) Date of Patent: Feb. 21, 2017

(54) QUANTUM KEY DISTRIBUTION TERMINAL AND SYSTEM

(71) Applicants: QUANTUMCTEK CO., LTD., Hefei, Anhui (CN); Shangdong Institute of Quantum Science and Technology Co., Ltd., Jinan, Shandong (CN)

(72) Inventors: Yong Zhao, Hefei (CN); Shibiao Tang, Hefei (CN); Jianhong Liu, Hefei (CN); Yunqi Dai, Hefei (CN); Xiaogang Li, Hefei (CN); Hongyu Wu, Hefei (CN)

(73) Assignees: QUANTUMCTEK CO., LTD., Hefei, Anhui (CN); SHANGDONG INSTITUTE OF QUANTUM SCIENCE AND TECHNOLOGY CO., LTD., Jinan, Shandong (CN)

( * ) Notice: Subject to any disclaimer, the term of this patent is extended or adjusted under 35 U.S.C. 154(b) by 0 days.

(21) Appl. No.: 15/025,308

(22) PCT Filed: Sep. 4, 2014

(86) PCT No.: PCT/CN2014/085892
§ 371 (c)(1),
(2) Date: Mar. 28, 2016

(87) PCT Pub. No.: WO2015/043367
PCT Pub. Date: Apr. 2, 2015

(65) Prior Publication Data
US 2016/0226598 A1 Aug. 4, 2016

(30) Foreign Application Priority Data

Sep. 30, 2013 (CN) .......................... 2013 1 0464744

(51) Int. Cl.
*H04B 10/00* (2013.01)
*H04B 10/70* (2013.01)
(Continued)

(52) U.S. Cl.
CPC ........... *H04B 10/70* (2013.01); *G06F 13/4027* (2013.01); *G06F 13/4208* (2013.01);
(Continued)

(58) Field of Classification Search
CPC ..................................................... H04B 10/70
See application file for complete search history.

(56) References Cited

U.S. PATENT DOCUMENTS

| | | | | |
|---|---|---|---|---|
| 5,812,572 A | * | 9/1998 | King | .................... H01S 5/06213 372/26 |
| 2012/0177201 A1 | * | 7/2012 | Ayling | .................. H04L 9/0858 380/278 |
| 2012/0269345 A1 | | 10/2012 | Ukita et al. | |

FOREIGN PATENT DOCUMENTS

| | | |
|---|---|---|
| CN | 101572600 | 11/2009 |
| CN | 102196425 | 9/2011 |

(Continued)

OTHER PUBLICATIONS

International Search Report mailed Dec. 4, 2014 for Chinese Application No. PCT/CN2014/085892 filed Sep. 4, 2014.

*Primary Examiner* — Daniel Dobson
(74) *Attorney, Agent, or Firm* — Maschoff Brennan

(57) ABSTRACT

Disclosed are a quantum key distribution terminal and system. An optical transceiving device and an electronics media board in a quantum key distribution system are organically integrated into a whole through an electronics back panel. A quantum key distribution terminal with a compact structure and a high integration level is provided, so that uniform testing, maintenance and management for various components in the quantum key distribution system can be realized, thereby realizing the integration and terminalization of the key distribution system. The same quantum key distribution terminal can also be used to conduct flexible networking, thereby setting up a quantum key distribution
(Continued)

system on a point to point, local area network or metropolitan area network scale.

16 Claims, 5 Drawing Sheets

(51) Int. Cl.
*G09C 1/00* (2006.01)
*H04L 9/08* (2006.01)
*G06F 13/40* (2006.01)
*G06F 13/42* (2006.01)
*H04J 14/00* (2006.01)

(52) U.S. Cl.
CPC .............. *G09C 1/00* (2013.01); *H04L 9/0852* (2013.01); *H04L 2209/12* (2013.01)

(56) References Cited

FOREIGN PATENT DOCUMENTS

| CN | 102983965 | 3/2013 |
| CN | 203466829 | 3/2014 |
| WO | 2006004883 A2 | 1/2006 |

* cited by examiner

QUANTUM KEY DISTRIBUTION TERMINAL AND SYSTEM

This application is the national phase of International Application No. PCT/CN2014/085892, titled "QUANTUM KEY DISTRIBUTION TERMINAL AND SYSTEM", and filed on Sep. 4, 2014, which claims priority to Chinese Patent Application No. 201310464744.4, titled "QUANTUM KEY DISTRIBUTION TERMINAL AND SYSTEM" and filed with the State Intellectual Property Office of People's Republic of China on Sep. 30, 2013, both of which are incorporated herein by reference in their entireties.

FIELD

The present disclosure relates to the technical field of quantum communications, and particularly to a quantum key distribution terminal and a system.

BACKGROUND

With the rapid development of quantum communications technology, quantum key distribution (Quantum Key Distribution, QKD) is becoming a mature applied technology. The technology is based on the no-clone theory and the uncertainty principle in quantum mechanics, and a generated key has a theoretically absolute security and is mainly applied to a scenario requiring a high security level. A conventional quantum key distribution hardware apparatus mainly includes an optical transceiver and an electronics board. The optical transceiver includes a light source board, an light path component and a detector, and the electronics board is mainly used for data processing, key generation and key management.

When the quantum key distribution hardware apparatus is being used, since components of the electronics board and the optical transceiver are independent and separate, multiple signal input/output interfaces of the electronics board are connected to corresponding interfaces of the light source board, the light path component and the detector of the optical transceiver, to form a quantum key distribution system, and the formed quantum key distribution system is applied to practical applications.

Those skilled in the art find the following disadvantages when using the quantum key distribution hardware apparatus:

The electronics board, the light source board, the light path component and the detector included in the quantum key distribution system are placed separately, thus testing, maintenance and management of the whole system are decentralized, and integrated management is hard to realize; and when a quantum key distribution network formed by multiple quantum key distribution systems is being used, networking of the quantum key distribution systems is complicated, and the management and the maintenance are more difficult.

SUMMARY

In view of this, a quantum key distribution terminal and a system are provided in the present disclosure, and components of the system are integrated into the terminal, which makes it convenient for testing, maintenance and management.

A quantum key distribution terminal is provided. The terminal includes:

an electronics backboard, an optical transceiver, an electronics board, a power source, a network interface, a key application interface, a quantum optical fiber interface and a chassis shell; where the electronics backboard includes a single-board interconnection interface, a high-speed photoelectric interface, a detector interface and a power source interface;

the optical transceiver includes a light source board, a light path component and a detector, where the light path component is connected to the light source board and the detector through an optical fiber pigtail and an optical fiber flange respectively;

the electronics board is configured to perform system maintenance and management, quantum key distribution control, system access, key storage and application and key post-processing;

a space formed in the chassis shell is divided into two independent spaces by the electronics backboard, where the optical transceiver is placed in one space, the electronics board is placed in the other space, and the power source is placed in a vacancy in either space;

the electronics backboard is connected to the electronics board through the single-board interconnection interface, connected to the light source board and the light path component in the optical transceiver through the high-speed photoelectric interface, and connected to the detector in the optical transceiver through the detector interface, providing signal and data exchange between the electronics board and the optical transceiver, and between the electronics boards;

the power source interface is connected to the power source and takes power from the power source, supplying the power for the electronics backboard and other devices in the terminal connected to the electronics backboard;

the network interface, the key application interface and the quantum optical fiber interface are installed on the chassis shell, and are configured to perform information exchange with an external device;

the network interface is connected to the electronics board, and is configured for the quantum key distribution terminal to perform data exchange with an external device;

the key application interface is connected to the electronics board, and is configured to provide a quantum key application for an external communications terminal connected to the quantum key distribution terminal; and the quantum optical fiber interface is connected to the light path component, and is configured to transmit an optical signal between multiple quantum key distribution terminals.

Optionally, the high-speed photoelectric interface outputs a light source drive signal, which is inputted by the electronics board through the single-board interconnection interface, to the light source board, where the light source drive signal is to control a laser on the light source board to emit light;

the detector interface inputs a detector counting signal, which is outputted by the detector, into the electronics board through the single-board interconnection interface, and the high-speed photoelectric interface outputs an optical modulator control signal, which is outputted by the electronics board through the single-board interconnection interface, to the light path component; and the high-speed photoelectric interface receives a synchronous electrical signal converted from a synchronous optical signal by the light path component, and inputs the synchronous electrical signal to the electronics board through the single-board interconnection interface, and the detector interface outputs a detector control signal, which is outputted by the electronics board through the single-board interconnection interface, to the detector.

Optionally, the electronics board is one board integrated with functions of system maintenance and management, quantum key distribution control, system access, key storage and application and key post-processing.

Optionally, the electronics board includes:

a system maintenance and management board, a quantum key distribution control board, a system access board, a key storage and application board and a key post post-processing board, wherein each of the boards is only integrated with one function.

Optionally, the terminal further includes:

a maintenance interface, wherein the maintenance interface is installed on the chassis shell, connected to the electronics backboard, connected to the electronics board through the single-board interconnection interface, and configured for device log query and software update.

Optionally, the terminal further includes:

two cooling fans, wherein one cooling fan is provided in each of the two independent spaces, and each of the two cooling fans is connected to a fan interface on the electronics backboard and takes power from the electronics backboard to operate.

Optionally, the chassis shell further includes:

two cooling windows, where the two cooling windows are placed at positions in correspondence with those of the two cooling fans in the terminal, to provide a good cooling channel.

Optionally, the chassis shell further includes:

two side ears, configured to fix the chassis shell to a cabinet.

Optionally, the terminal further includes:

at least one tamper detection switch, where the at least one tamper detection switch is connected to the electronics board, and is configured to transmit a sensing signal to the electronics board in a case a cover of the chassis is opened by force, so that the electronics board performs the function of system management and maintenance to erase information stored in the terminal through a standby battery in the electronics board.

Optionally, the chassis shell further includes:

an electrostatic socket, configured to avoid an electrostatic effect.

Optionally, the chassis shell further includes:

at least one device status indication lamp, where the at least one device status indication lamp is connected to the electronics board.

Optionally, the chassis shell further includes:

at least one interface baffle, configured to lock up an interface provided on the chassis shell.

A quantum key distribution system is provided. The system includes:

two quantum key distribution terminals according to claims of the disclosure; where network interfaces of the two quantum key distribution terminals are connected through a network cable, which provides a data exchange channel in the process of basis sifting, error correction and privacy amplification for the two quantum key distribution terminals;

quantum optical fiber interfaces of the two quantum key distribution terminals are connected through an optical fiber, which provides a channel for the two quantum key distribution terminals to transmit an optical signal; and each of the two quantum key distribution terminals is connected to at least one communications terminal through a key application interface, which provides a channel for signal and data exchange between the quantum key distribution system and the at least one communications terminal, and provides a quantum key application for the at least one communications terminal connected to the quantum key distribution system.

A quantum key distribution system is provided. The system includes:

at least one optical switch, at least one switch, at least two quantum key distribution terminals according to claims of the disclosure, and a quantum key distribution control center; where the at least one switch is configured to provide a classic network resource;

each of the at least two quantum key distribution terminals is connected to the quantum key distribution control center through the classic network resource;

the at least one optical switch is connected to quantum optical fiber interfaces of the at least two quantum key distribution terminals through optical fibers, which provides switches between quantum channels for the at least two quantum key distribution terminals connected thereto;

the at least one optical switch is connected to one another through an optical fiber, and each of the at least one optical switch is directly or indirectly controlled by the quantum key distribution control center;

the quantum key distribution control center is configured to transmit control signals, where the control signals are to control operating states of the at least two quantum key distribution terminals and the at least one optical switch; and each of the at least two quantum key distribution terminals is connected to at least one communications terminal through a key application interface.

Optionally, each of the at least one optical switch is directly controlled by the quantum key distribution control center in the following steps:

each of the at least one optical switch is directly connected to the quantum key distribution control center through the classic network resource; and the quantum key distribution control center directly transmits the control signals to the at least one optical switch through the classic network resource, to control the at least one optical switch to switch the quantum channels.

Optionally, each of the at least one optical switch is indirectly controlled by the quantum key distribution control center in the following steps:

each of the at least one optical switch is connected to network interfaces of the at least two quantum key distribution terminals through network cables; and the quantum key distribution control center transmits the control signals to the at least two quantum key distribution terminals connected thereto through the classic network resource, and the at least two quantum key distribution terminals transmit the control signals to the at least one optical switch connected thereto through the network cables.

According to the description above, the disclosure has the following beneficial effects.

A quantum key distribution terminal and a system are provided in the disclosure. An optical transceiver and an electronics board in the quantum key distribution system are organically integrated as a whole through an electronics backboard. A quantum key distribution terminal with a compact structure and high integration is provided, so that uniform testing, maintenance and management for various components in the quantum key distribution system may be realized, and the integration and terminalization of the key distribution system may be realized. The same quantum key distribution terminals may be also used for flexible networking, in order to set up a quantum key distribution system on a scale of point-to-point, local area network or metropolitan area network.

BRIEF DESCRIPTION OF THE DRAWINGS

The drawings to be used in the description of embodiments or conventional technology are described briefly hereinafter, so that technical solutions according to the embodiments of the disclosure or according to conventional technology may become clearer. Apparently, the drawings in the following description only illustrate some embodiments of the disclosure. For those skilled in the art, other drawings may be obtained based on these drawings without any creative work.

DETAILED DESCRIPTION

A quantum key distribution terminal and a quantum key distribution system are provided in the present disclosure, components of the system are integrated into the terminal, which makes it convenient for testing, maintenance and management, and flexible networking can be conducted on multiple terminals.

Specific embodiments of the disclosure are described in detail hereinafter in conjunction with the drawings.

Figure 1:
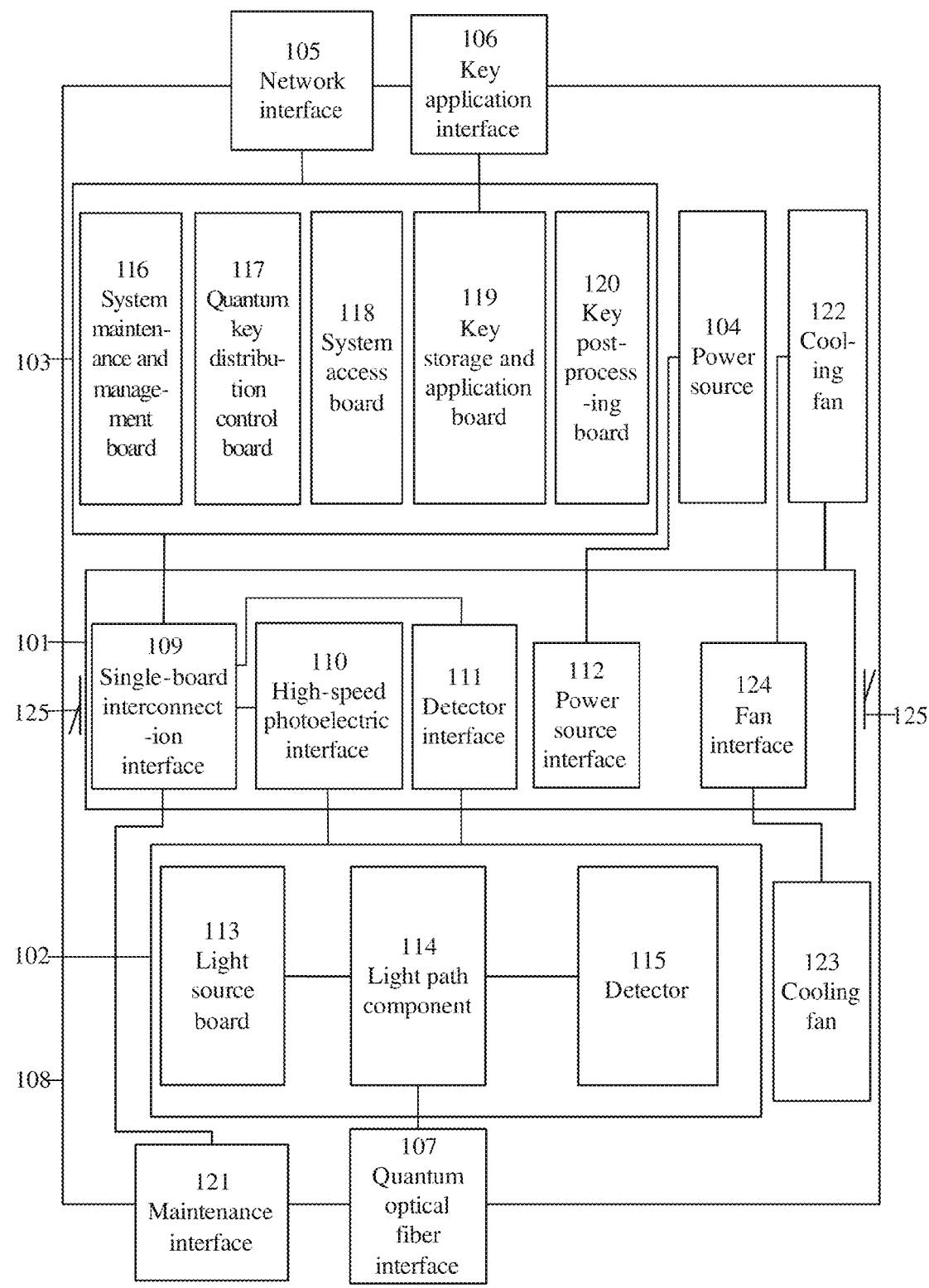
FIG. 1 is a structural diagram of the inside of a quantum key distribution terminal of the present disclosure.
Figure 2:
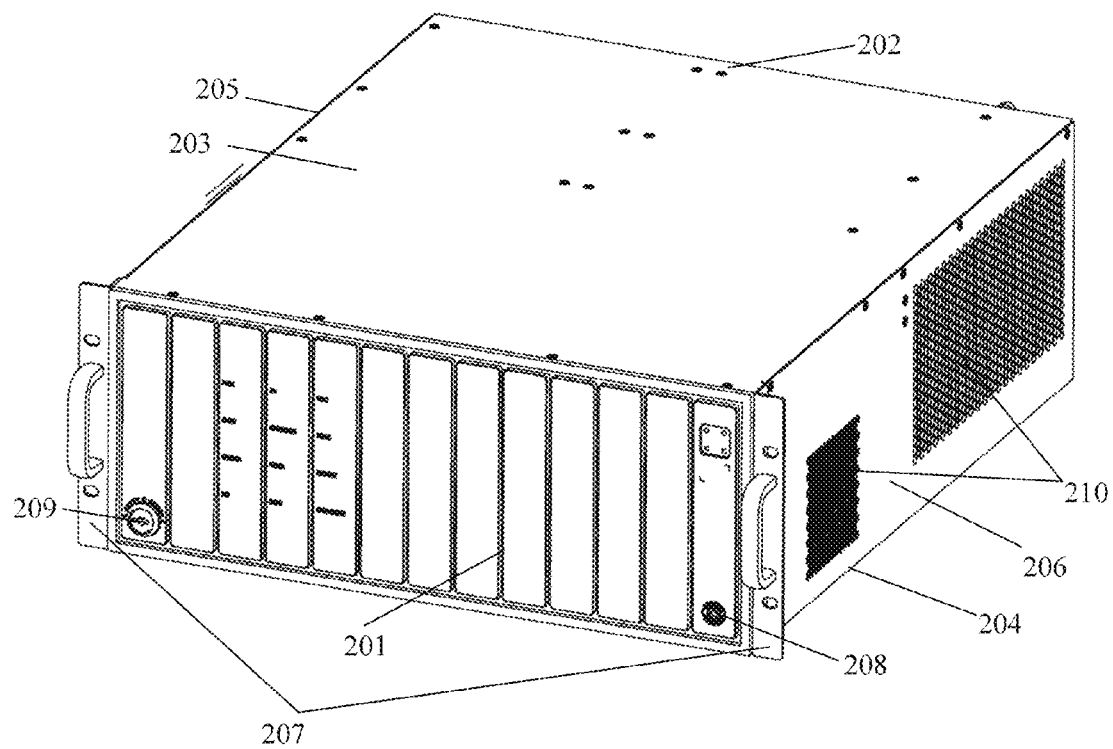
FIG. 2 is a structural diagram of a chassis shell of a quantum key distribution terminal of the present disclosure.

FIG. 1 is a structural diagram of the inside of a quantum key distribution terminal of the present disclosure, and FIG. 2 is a structural diagram of a chassis shell of a quantum key distribution terminal of the present disclosure. The quantum key distribution terminal includes:

an electronics backboard 101, an optical transceiver 102, an electronics board 103, a power source 104, a network interface 105, a key application interface 106, a quantum optical fiber interface 107 and a chassis shell 108.

The electronics backboard 101 includes a single-board interconnection interface 109, a high-speed photoelectric interface 110, a detector interface 111 and a power source interface 112.

The single-board interconnection interface 109 is a ZD high-speed connector conforming to the advanced telecommunications computing architecture (Advanced Telecommunications Computing Architecture, AdvancedTCA) standard.

The high-speed photoelectric interface 110 is a low voltage differential signaling (Low Voltage Differential Signaling, LVDS) high-speed interface.

The detector interface 111 is a coaxial connector or an LVDS high-speed interface.

The power source interface 112 is an ERNI ATCA power source connector.

In practical design, particular forms of the interfaces on the electronics backboard 101 match external interfaces of the electronics board, the optical transceiver and the power source connected thereto. It is only an example herein, and the particular forms are not intended to limit the disclosure.

The optical transceiver 102 includes a light source board 113, a light path component 114 and a detector 115, where the light path component 114 is connected to the light source board 113 and the detector 115 through an optical fiber pigtail and an optical fiber flange, respectively.

The electronics board 103 is configured to perform system maintenance and management, quantum key distribution control, system access, key storage and application and key post-processing.

Optionally, the electronics board 103 is one board integrated with functions of system maintenance and management, quantum key distribution control, system access, key storage and application and key post-processing.

Optionally, the electronics board 103 includes a system maintenance and management board 116, a quantum key distribution control board 117, a system access board 118, a key storage and application board 119 and a key post-processing board 120, where each of the boards is only integrated with one function.

In other words, the system maintenance and management board 116 is configured to perform the function of system maintenance and management;

the quantum key distribution control board 117 is configured to perform the function of quantum key distribution control;

the system access board 118 is configured to perform the function of system access;

the key storage and application board 119 is configured to perform the function of key storage and application; and the key post-processing board 120 is configured to perform the function of key post-processing.

In conclusion, in practical development, the functions of the five electronics boards may be integrated into one, two, three or four electronics boards, or distributed into six, seven or more electronics boards, depending on factors such as a development difficulty and a development cost.

A space formed in the chassis shell 108 is divided into two independent spaces through the electronics backboard 101, where the optical transceiver 102 is placed in one of the two spaces, the electronics board 103 is placed in the other space, and the power source 104 is placed in a vacancy in either of the two spaces.

The electronics backboard 101 is connected to the electronics board 103 through the single-board interconnection interface 109, connected to the light source board 113 and the light path component 114 in the optical transceiver 102 through the high-speed photoelectric interface 110, and connected to the detector 115 in the optical transceiver 102 through the detector interface 111, providing signal and data exchange between the electronics board 103 and the optical transceiver 102, and between respective electronics boards 103.

The electronics board 103 performs the signal and data interaction with the electronics backboard 101 through the single-board interconnection interface 109. The electronics backboard 101 performs the signal and data interaction with the optical transceiver 102 through the high-speed photoelectric interface 110 and the detector interface 111.

The high-speed photoelectric interface 110 outputs a light source drive signal, which is inputted from the electronics board 103 through the single-board interconnection interface 109, to the light source board 113, where the light source drive signal is to control a laser on the light source board 113 to emit light.

The function of quantum key distribution control of the electronics board 103 can be modified, to change a frequency of a signal which drives the light source board 113, so that the quantum key distribution terminal can operate at different key distribution frequencies.

Optionally, the electronics board 103 is one board integrated with functions of system maintenance and management, quantum key distribution control, system access, key storage and application and key post-processing. When performing the function of quantum key distribution control, the electronics board 103 transmits a light source drive signal to the high-speed photoelectric interface 110 through the single-board interconnection interface 109, and the high-speed photoelectric interface 110 outputs the light source drive signal to the light source board 113.

Optionally, the electronics board 103 includes a system maintenance and management board 116, a quantum key distribution control board 117, a system access board 118, a key storage and application board 119 and a key post-processing board 120. The quantum key distribution control board 117 transmits the light source drive signal to the high-speed photoelectric interface 110 through the single-board interconnection interface 109, and the high-speed photoelectric interface 110 outputs the light source drive signal to the light source board 113, where the light source drive signal is to control a laser on the light source board 113 to emit light.

The detector interface 111 inputs a detector counting signal outputted from the detector 115 into the electronics board 103 through the single-board interconnection interface 109, and the high-speed photoelectric interface 110 outputs an optical modulator control signal outputted from the electronics board 103 through the single-board interconnection interface 109 to the light path component 114, where the optical modulator control signal is to control an optical modulator in the light path component 114.

Optionally, the electronics board 103 is one board integrated with functions of system maintenance and management, quantum key distribution control, system access, key storage and application and key post-processing. When performing the function of quantum key distribution control, the electronics board 103 receives a detector counting signal which is transmitted from the detector 115 through the detector interface 111 and the single-board interconnection interface 109, and outputs an optical modulator control signal to the light path component 114 through the single-board interconnection interface 109 and the high-speed photoelectric interface 110, in order to control an optical modulator in the light path component 114.

Optionally, the electronics board 103 includes a system maintenance and management board 116, a quantum key distribution control board 117, a system access board 118, a key storage and application board 119 and a key post-processing board 120. The quantum key distribution control board 117 receives a detector counting signal which is transmitted from the detector 115 through the detector interface 111 and the single-board interconnection interface 109, and outputs an optical modulator control signal to the light path component 114 through the single-board interconnection interface 109 and the high-speed photoelectric interface 110, in order to control an optical modulator in the light path component 114.

The high-speed photoelectric interface 110 receives a synchronous electrical signal converted from a synchronous optical signal by the light path component 114, and input the synchronous electrical signal into the electronics board 103 through the single-board interconnection interface 109, and the detector interface 111 outputs a detector control signal outputted from the electronics board 103 through the single-board interconnection interface 109 to the detector 115.

Optionally, the electronics board 103 is one board integrated with functions of system maintenance and management, quantum key distribution control, system access, key storage and application and key post-processing. When performing the function of quantum key distribution control, the electronics board 103 receives a synchronous electrical signal inputted by the light path component 114 through the high-speed photoelectric interface 110 and the single-board interconnection interface 109, and outputs a detector control signal to the detector 115 through the single-board interconnection interface 109 and the detector interface 111.

Optionally, the electronics board 103 includes a system maintenance and management board 116, a quantum key distribution control board 117, a system access board 118, a key storage and application board 119 and a key post-processing board 120. The quantum key distribution control board 117 receives a synchronous electrical signal inputted by the light path component 114 through the high-speed photoelectric interface 110 and the single-board interconnection interface 109, and outputs a detector control signal to the detector 115 through the single-board interconnection interface 109 and the detector interface 111.

It should be noted that, the synchronous optical signal is usually converted to the synchronous electrical signal through a circuit. In practical design, the functional circuit may be integrated into any of the light source board 114, the light path component 114 and the detector 115, and the connection to the high-speed photoelectric interface 110 may be adjusted accordingly, which is merely an illustration and is not intended to limit the disclosure herein.

The power source interface 112 is connected to the power source 104 and takes power from the power source 104, supplying the power for the electronics backboard 101 and other devices in the terminal connected to the electronics backboard 101.

The network interface 105, the key application interface 106 and the quantum optical fiber interface 107 are placed on the chassis shell, and are configured to perform information exchange with an external device.

The network interface 105 is connected to the electronics board 103, and is configured for the quantum key distribution terminal to perform data exchange with an external device, and especially to perform classic channel communications of quantum key distribution.

Optionally, the electronics board 103 includes a system maintenance and management board 116, a quantum key distribution control board 117, a system access board 118, a key storage and application board 119 and a key post-processing board 120. Each of the boards can perform data exchange with an external device through the network interface 105. It should be noted that, there may be one or more network interfaces 105. The respective electronics boards may perform data exchange with an external device through one network interface 105, or each of the electronics boards is provided with a network interface 105 to perform data exchange with an external device.

The key application interface 106 is connected to the electronics board 103, and is configured to provide a quantum key application for an external communications terminal connected to the quantum key distribution terminal.

Optionally, the electronics board 103 includes a system maintenance and management board 116, a quantum key distribution control board 117, a system access board 118, a key storage and application board 119 and a key post-processing board 120. The key application interface 106 is connected to the key storage and application board 119.

The quantum optical fiber interface 107 is connected to the light path component 114, and is configured to transmit an optical signal between multiple quantum key distribution terminals to perform quantum channel communications.

Optionally, the terminal further includes:

a maintenance interface 121, which is installed on the chassis shell 108, connected to the electronics backboard 101, connected to the electronics board 103 through the single-board interconnection interface 109, and configured for device log query and software update.

The electronics board 103 includes a system maintenance and management board 116, a quantum key distribution control board 117, a system access board 118, a key storage and application board 119 and a key post-processing board 120. The maintenance interface 121 is connected to the system maintenance and management board 116 through the single-board interconnection interface 109.

Optionally, the terminal further includes:

two cooling fans 122 and 123, where each of the two independent spaces is provided with one cooling fan, and each of the two cooling fans 122 and 123 is connected to a fan interface 124 of the electronics backboard 101 and takes power from the electronics backboard 101 to operate.

The fan interface 124 is an ERNI iBridge connector.

Optionally, the chassis shell 108 further includes:

two side ears 207, configured to fix the chassis shell 108 to a cabinet.

In most of the operating time, the quantum key distribution terminal is laid as illustrated in FIG. 2. The chassis shell 108 includes: a front cover 201, a rear cover 202, a top cover 203, a bottom cover 204, a left cover 205 and a right cover 206. Two detachable side ears 207 are provided on the front cover 201 of the chassis shell 108.

Optionally, the terminal further includes:

at least one tamper detection switch 125, which is connected to the electronics board 103, and is configured to transmit a sensing signal to the electronics board 103 in a case that a cover of the chassis shell 108 is open by force, so that the electronics board 103 can perform the function of system management and maintenance to erase information stored in the device through a standby battery in the electronics board 103, to prevent important information from being stolen.

The electronics board 103 includes a system maintenance and management board 116, a quantum key distribution control board 117, a system access board 118, a key storage and application board 119 and a key post-processing board 120. The tamper detection switch 125 is connected to the system maintenance and management board 116.

Optionally, the chassis shell 108 further includes:

an electrostatic socket 208, configured to avoid an electrostatic effect.

The electrostatic socket 208 is placed on the front cover 201 of the chassis shell 108, and may also be placed at other position on the chassis shell 108, without being limited to the position illustrated in FIG. 2.

Optionally, the chassis shell 108 further includes:

at least one device status indication lamp, connected to the electronics board 103.

The at least one device status indication lamp is usually placed on the front cover 201 of the chassis shell 108, convenient for a user to check an operating status of the device, and the at least one device status indication lamp may be an LED lamp.

The electronics board 103 includes a system maintenance and management board 116, a quantum key distribution control board 117, a system access board 118, a key storage and application board 119 and a key post-processing board 120. The at least one device status indication lamp is connected to the system maintenance and management board 116.

Optionally, the chassis shell 108 further includes:

at least one interface baffle 209, configured to lock up an interface placed on the chassis shell 108.

The at least one interface baffle 209 is placed on the front cover 201 of the chassis shell 108, and is configured to lock up an interface for test and maintenance (such as the maintenance interface 121 and a quantum optical fiber interface specially provided for test) placed on the chassis shell 108, for the exclusive use of a tester and maintainer. The at least one interface baffle 209 may be placed at any other position on the chassis shell 108 as needed, without being limited to the position illustrated in FIG. 2.

Optionally, the chassis shell 108 further includes:

two cooling windows 210.

As illustrated in FIG. 2, two cooling windows 210 are placed on the right cover 206 of the chassis shell 108, and the two cooling windows 210 are placed at positions in correspondence with those of the two cooling fans 122 and 123, to provide a good cooling channel.

As can be seen from the descriptions above, the disclosure has the following beneficial effects.

In one aspect, an optical transceiver and an electronics board in a quantum key distribution system are organically integrated as a whole through an electronics backboard, which provides a quantum key distribution terminal with a compact structure and a high integration, so that uniform testing, maintenance and management for various components in the quantum key distribution system may be realized, and integration and terminalization of the key distribution system may be achieved.

In another aspect, the quantum key distribution relates to transmission of various critical signals, such as a synchronous optical signal, a light source drive signal, an optical modulator control signal, a detector control signal and a detector counting signal. High-efficiency cooperative operation of the electronics board and the optical transceiver is realized through design of merely three main functional interfaces, i.e., a single-board interconnection interface, a high-speed photoelectric interface and a detector interface on the electronics backboard. Especially, the high-speed photoelectric interface is designed with function integration and high-speed signal transmission, which can save cost and be compatible with a high-speed QKD system.

In still another aspect, the quantum key distribution terminal may choose unidirectional or bidirectional quantum key distribution as needed, to reduce cost of a device.

In yet another aspect, the quantum key distribution terminal is provided with a function of tamper protection. The device can erase stored information in a case that the device is under a malicious attack or encounters information stealing.

In still another aspect, external interfaces of the quantum key distribution terminal are simple, and same quantum key distribution terminals may be used for flexible networking, in order to set up a quantum key distribution system or network on a scale of point-to-point, local area network or metropolitan area network.

A Second Embodiment

Figure 3:
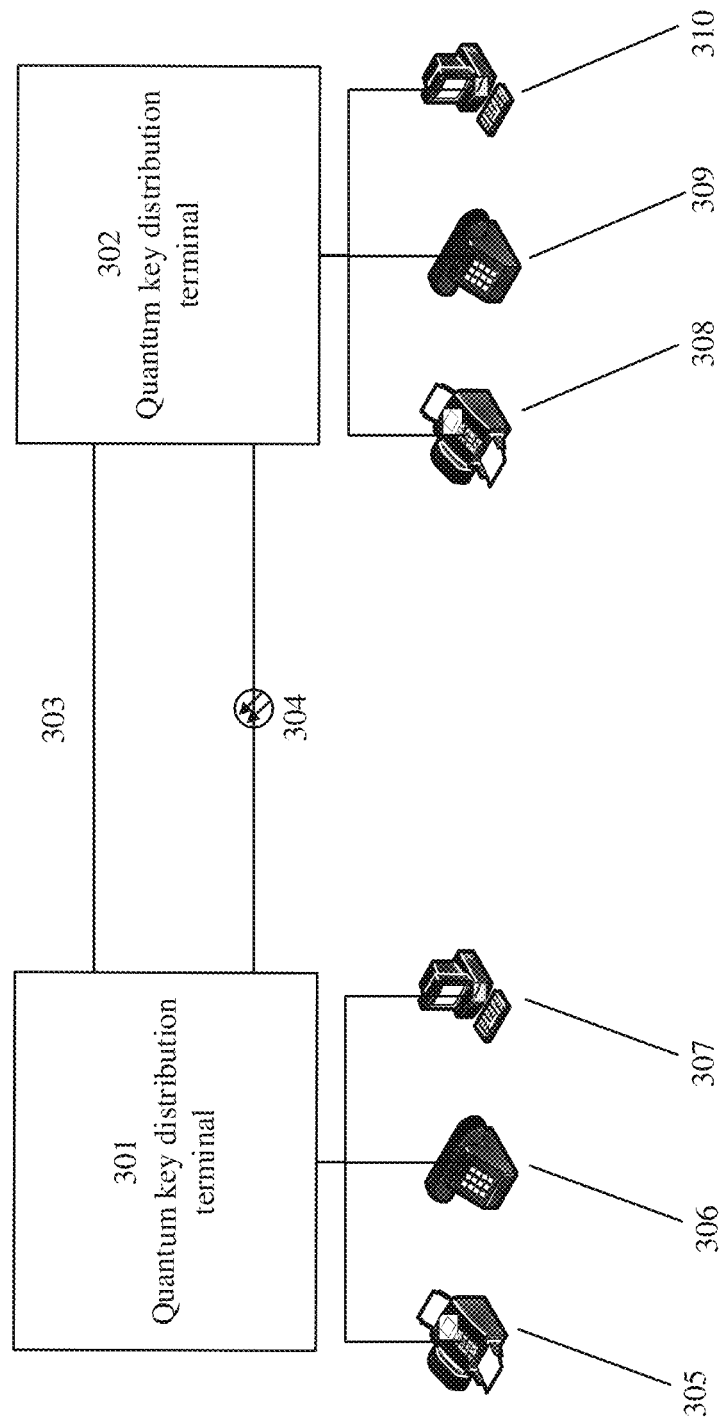
FIG. 3 is a structural diagram of a quantum key distribution system according to a second embodiment of the disclosure.

FIG. 3 is a structural diagram of a quantum key distribution system according to the second embodiment of the disclosure. The quantum key distribution system includes:

two quantum key distribution terminals 301 and 302 according to the first embodiment of the disclosure.

The quantum key distribution terminal 301 may function as a transmitter, and the other quantum key distribution terminal 302 functions as a receiver. Or, each of the two quantum key distribution terminals may function as a transmitter and a receiver simultaneously.

Network interfaces of the two quantum key distribution terminals 301 and 302 are connected through a network cable 303, which provides a data exchange channel in the process of basis sifting, error correction and privacy amplification for the two quantum key distribution terminals.

Quantum optical fiber interfaces of the two quantum key distribution terminals are connected through an optical fiber 304, which provides a channel, i.e., a quantum channel, for the two quantum key distribution terminals to transmit an optical signal.

Each of the two quantum key distribution terminals is connected to at least one of communications terminals 305 to 310 through a key application interface, which provides a channel for signal and data exchange between the quantum key distribution system and the at least one of the communications terminals, and provides a quantum key application for the at least one of the communications terminals connected to the quantum key distribution system.

Start command received by each of the quantum key distribution terminals is transmitted to the system access board through a network interface, and further transmitted to the quantum key distribution control board through the single-board interconnection interface on the electronics backboard after a protocol conversion.

The quantum key distribution control board of the electronics board of the transmitter outputs a light source drive signal, and the light source drive signal is transmitted to the light source board through the single-board interconnection interface and the high-speed photoelectric interface on the electronics backboard in sequence, in order to drive the light source board to emit a synchronous light and a signal light. The synchronous light and the signal light are outputted to the light path component for processing, and further outputted outward through the quantum optical fiber interface.

The receiver, in one aspect, performs data exchange with the transmitter through a channel formed by the network interface and the network cable 303, and in another aspect, receives, through a channel formed by the quantum optical fiber interface and the optical fiber 304, the synchronous light and the signal light which are outputted by the transmitter. The synchronous light is converted into a synchronous electrical signal through the light path component of the receiver, and the synchronous electrical signal is inputted into the high-speed photoelectric interface on the electronics backboard and then transmitted to the quantum key distribution control board of the receiver through the single-board interconnection interface. A gate control signal is obtained after the quantum key distribution control board performs phase locking and delaying on the synchronous electrical signal. The gate control signal is outputted to the electronics backboard through the single-board interconnection interface, and then transmitted to the detector of the receiver through the detector interface on the electronics backboard. The signal light is transmitted to the detector of the receiver after being processed by the light path component of the receiver, and a counting signal outputted by the detector of the receiver is transmitted to the quantum key distribution control board of the receiver through the detector interface and the single-board interconnection interface on the electronics backboard in sequence. An optical modulator control signal is outputted by the quantum key distribution control board to the electronics backboard through the single-board interconnection interface, and is further transmitted to the light path component of the receiver through the high-speed photoelectric interface on the electronics backboard, in order to control the optical modulator in the light path component.

Post-processing operations such as basis sifting, error correction and privacy amplification are performed on obtained raw key data in the key post-processing board, and a final key obtained through the post-processing operations is stored in the key storage and application board. The key storage and application board is connected to the key application interface, which can provide quantum key applications to communications terminals such as fax machines 305 and 308, telephones 306 and 309 and personal computers 307 and 310.

A Third Embodiment

Figure 4:
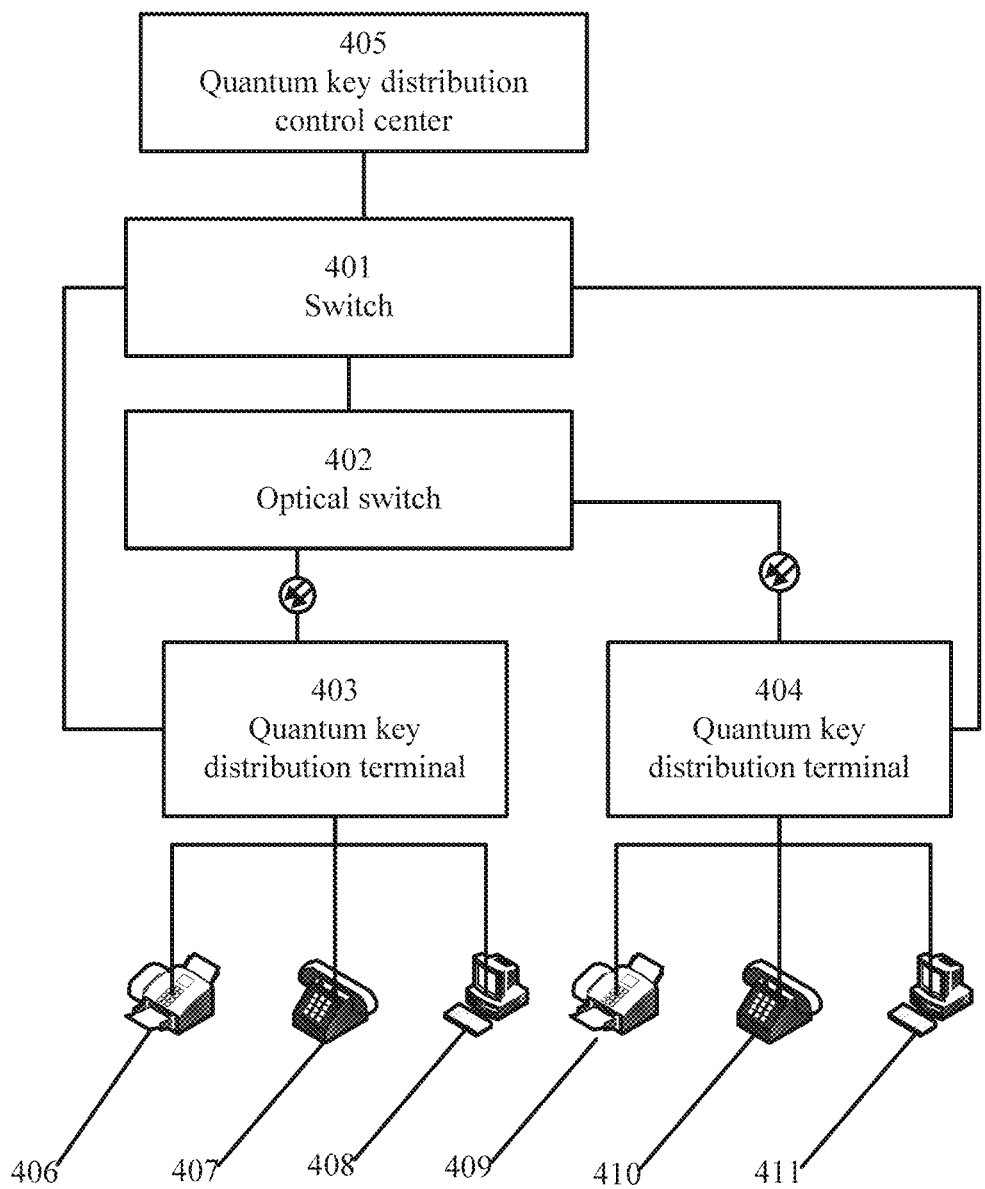
FIG. 4 is a structural diagram of a quantum key distribution system according to a third embodiment of the disclosure.

FIG. 4 is a structural diagram of a quantum key distribution system according to the third embodiment of the disclosure. The quantum key distribution system includes:

at least one switch 401, at least one optical switch 402, at least two quantum key distribution terminals 403 and 404 according to the first embodiment of the disclosure, and a quantum key distribution control center 405.

As illustrated in FIG. 4, the switch 401, the optical switch 402, the two quantum key distribution terminals 403 and 404 according to the first embodiment of the disclosure, and the quantum key distribution control center 405 may form a quantum key distribution local area network. It should be noted that, the number of quantum key distribution terminals is not limited to two as illustrated in FIG. 4, but may be more than two.

Figure 5:
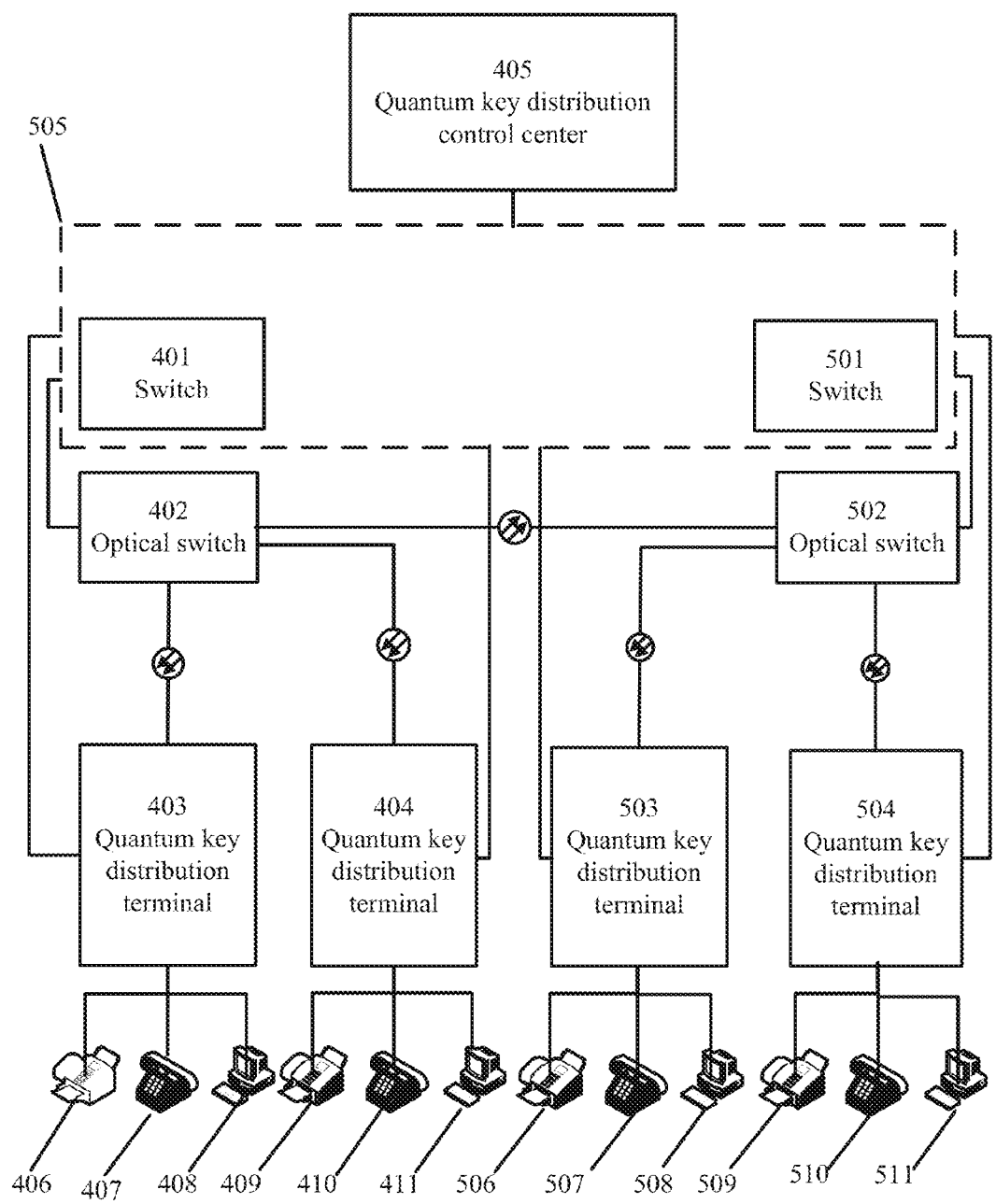
FIG. 5 is a structural diagram of a quantum key distribution network formed by quantum key distribution systems of the present disclosure.

Likewise, as illustrated in FIG. 5, a switch 501, an optical switch 502, two quantum key distribution terminals 503 and 504 according to the first embodiment of the disclosure, and the quantum key distribution center 405 may form another quantum key distribution local area network.

In a quantum key distribution network illustrated in FIG. 5, the quantum key distribution control center 405 performs a uniform management, and the switch 401 and the switch 501 provide a classic network resource 505. Each of the quantum key distribution terminals is connected to the quantum key distribution control center 405 through the classic network resource 505. The optical switch 402 is connected to quantum optical fiber interfaces of the quantum key distribution terminals 403 and 404 through optical fibers, the optical switch 502 is connected to quantum optical fiber interfaces of the quantum key distribution terminals 503 and 504 through optical fibers, and the optical switch 402 and the optical switch 502 are connected to each other through an optical fiber, thereby forming a quantum key distribution network on a larger scale, such as a quantum key distribution wide area network and a quantum key distribution metropolitan area network. The number of switches in the classic network resource 505 may be determined based on a scale of the network, and the number of the switches needs to be increased if there are more device access points, to meet a requirement for the classic network resource (for example, network interfaces).

In the quantum key distribution network, the quantum key distribution terminals 403 and 404 are in one quantum key distribution local area network, and can perform point-to-point quantum key distribution and related key applications. Similarly, the quantum key distribution terminals 503 and 504 are in another quantum key distribution local area network, and can perform point-to-point quantum key distribution and related key applications.

In a case that the number of the quantum key distribution terminals is equal to or larger than 3, it is required to switch between quantum channels, and the switching is performed under uniform control of the quantum key distribution control center 405 through the classic network resource 505. The quantum key distribution control center 405 transmits a control signal to the optical switch through the classic network resource 505, to control the optical switch to switch a quantum channel.

Each of the optical switches is directly or indirectly controlled by the quantum key distribution control center 405.

In a case the quantum key distribution control center 405 is directly connected to the optical switches through the classic network resource 505, the quantum key distribution control center 405 directly transmits a control signal to the optical switch through the classic network resource 505, to control the optical switch to switch a quantum channel.

In a case the optical switches are indirectly controlled by the quantum key distribution control center 405, the optical switches and the quantum key distribution control center 405 may be connected in the following way:

each of the optical switches is connected to a network interface of the quantum key distribution terminal through a network cable; and the quantum key distribution control center 405 transmits a control signal to the quantum key distribution terminal connected thereto through the classic network resource 505, and the quantum key distribution terminal transmits the control signal to an optical switch connected thereto through the network cable.

FIG. 5 illustrates a possible connection in a case the optical switches are directly controlled by the quantum key distribution control center 405, and other possible connections are not illustrated herein, which are subject to description in the specification.

Each of the quantum key distribution terminals is connected to at least one communications terminal through a key application interface.

The quantum key distribution terminal 403 is connected to external communications terminals 406 to 408, the quantum key distribution terminal 404 is connected to external communications terminals 409 to 411, the quantum key distribution terminal 503 is connected to external communications terminals 506 to 508, and the quantum key distribution terminal 504 is connected to external communications terminals 509 to 511. In practical applications, the connections are not limited to the above, and there may be other connections, which are not described herein.

In FIG. 5, there are only two optical switches connected to each other and two switches providing the classic network resource. There may be more switches and optical switches in another quantum key distribution system.

The switches are configured to provide the classic network resource 505.

The optical switches are configured to provide an optical fiber interconnection and a switch between quantum channels for quantum key distribution terminals connected thereto.

The quantum key distribution control center 405 is configured to transmit a control signal, where the control signal is to control operating states of the quantum key distribution terminals and the optical switches.

The quantum key distribution control center 405 uniformly manages, coordinates and configures operating states of quantum key distribution terminals and optical switches in a quantum key distribution local area network or a quantum key distribution network on a larger scale, to control the quantum key distribution in the quantum key distribution local area network or in the quantum key distribution network on a larger scale across quantum key distribution local area networks. For example, the quantum key distribution control center 405 may control the optical switch 402 and the optical switch 502, so that a quantum channel is established between the quantum key distribution terminal 403 and the quantum key distribution terminal 504 while no quantum channel is established between the quantum key distribution terminal 404 and the quantum key distribution terminal 503. Also, the quantum key distribution terminal 403 and the quantum key distribution terminal 504 are connected to each other through the classic network resource 505. Thus the quantum key distribution terminal 403 and the quantum key distribution terminal 504 form a quantum key distribution system. The number of quantum key distribution terminals connected to each of the two optical switches is not limited to two but can be more than two, and the management and control of multiple connected quantum key distribution terminals is similar to the description above, which is not described herein.

It should be noted that, the foregoing embodiments are merely described for a purpose of illustration, the disclosure is not limited to the foregoing embodiments, and there may be other similar embodiments which are not described herein.

Described above are merely preferred embodiments of the disclosure, which are not intended to limit the disclosure. Any modification, equivalent substitution and improvement without departing from the spirit and principle of the disclosure shall fall in the protection scope of the disclosure.

The invention claimed is:

1. A quantum key distribution terminal, comprising:
an electronics backboard, an optical transceiver, an electronics board, a power source, a network interface, a key application interface, a quantum optical fiber interface and a chassis shell; wherein
the electronics backboard comprises a single-board interconnection interface, a high-speed photoelectric interface, a detector interface and a power source interface;
the optical transceiver comprises a light source board, a light path component and a detector, wherein the light path component is connected to the light source board and the detector through an optical fiber pigtail and an optical fiber flange respectively;
the electronics board is configured to perform system maintenance and management, quantum key distribution control, system access, key storage and application, and key post-processing;
a space formed in the chassis shell is divided into two independent spaces by the electronics backboard, wherein the optical transceiver is placed in one space, the electronics board is placed in the other space, and the power source is placed in a vacancy in either space;
the electronics backboard is connected to the electronics board through the single-board interconnection interface, connected to the power source and the light path component in the optical transceiver through the high-speed photoelectric interface, and connected to the detector in the optical transceiver through the detector interface, wherein the electronics backboard is configured to provide signal and data exchange between the electronics board and the optical transceiver, and provide signal and data exchange between boards of the electronics board if the electronics board comprises a plurality of boards;

the power source interface is connected to the power source and takes power from the power source, supplying the power for the electronics backboard and other devices in the terminal connected to the electronics backboard;

the network interface, the key application interface and the quantum optical fiber interface are installed on the chassis shell, and are configured to perform information exchange with an external device;

the network interface is connected to the electronics board, and is configured for the quantum key distribution terminal to perform data exchange with an external device;

the key application interface is connected to the electronics board, and is configured to provide a quantum key application for an external communications terminal connected to the quantum key distribution terminal; and the quantum optical fiber interface is connected to the light path component, and is configured to transmit an optical signal between multiple quantum key distribution terminals.

2. The terminal according to claim 1, wherein the high-speed photoelectric interface outputs a light source drive signal, which is inputted by the electronics board through the single-board interconnection interface, to the light source board, wherein the light source drive signal is to control a laser on the light source board to emit light;

the detector interface inputs a detector counting signal, which is outputted by the detector, into the electronics board through the single-board interconnection interface, and the high-speed photoelectric interface outputs an optical modulator control signal, which is outputted by the electronics board through the single-board interconnection interface, to the light path component; and the high-speed photoelectric interface receives a synchronous electrical signal converted from a synchronous optical signal by the light path component, and inputs the synchronous electrical signal to the electronics board through the single-board interconnection interface, and the detector interface outputs a detector control signal, which is outputted by the electronics board through the single-board interconnection interface, to the detector.

3. The terminal according to claim 1, wherein the electronics board is one board integrated with functions of system maintenance and management, quantum key distribution control, system access, key storage and application, and key post-processing.

4. The terminal according to claim 1, wherein the electronics board comprises:

a system maintenance and management board, a quantum key distribution control board, a system access board, a key storage and application board and a key post-processing board, wherein each of the boards is only integrated with one function.

5. The terminal according to claim 1, further comprising:

a maintenance interface, wherein the maintenance interface is installed on the chassis shell, connected to the electronics backboard, connected to the electronics board through the single-board interconnection interface, and configured for device log query and software update.

6. The terminal according to claim 1, further comprising:

two cooling fans, wherein one cooling fan is provided in each of the two independent spaces, and each of the two cooling fans is connected to a fan interface on the electronics backboard and takes power from the electronics backboard to operate.

7. The terminal according to claim 6, wherein the chassis shell further comprises:

two cooling windows, wherein the two cooling windows are placed at positions in correspondence with those of the two cooling fans in the terminal, to provide a good cooling channel.

8. The terminal according to claim 1, wherein the chassis shell further comprises:

two side ears, configured to fix the chassis shell to a cabinet.

9. The terminal according to claim 1, further comprising:

at least one tamper detection switch, wherein the at least one tamper detection switch is connected to the electronics board, and is configured to transmit a sensing signal to the electronics board in a case a cover of the chassis is opened by force, so that the electronics board performs the function of system management and maintenance to erase information stored in the terminal through a standby battery in the electronics board.

10. The terminal according to claim 1, wherein the chassis shell further comprises:

an electrostatic socket, configured to avoid an electrostatic effect.

11. The terminal according to claim 1, wherein the chassis shell further comprises:

at least one device status indication lamp, wherein the at least one device status indication lamp is connected to the electronics board.

12. The terminal according to claim 1, wherein the chassis shell further comprises:

at least one interface baffle, configured to lock up an interface provided on the chassis shell.

13. A quantum key distribution system, comprising:

two quantum key distribution terminals according to claim 1, wherein network interfaces of the two quantum key distribution terminals are connected through a network cable, which provides a data exchange channel in the process of basis sifting, error correction and privacy amplification for the two quantum key distribution terminals;

quantum optical fiber interfaces of the two quantum key distribution terminals are connected through an optical fiber, which provides a channel for the two quantum key distribution terminals to transmit an optical signal; and each of the two quantum key distribution terminals is connected to at least one communications terminal through a key application interface, which provides a channel for signal and data exchange between the quantum key distribution system and the at least one communications terminal, and provides a quantum key application for the at least one communications terminal connected to the quantum key distribution system.

14. A quantum key distribution system, comprising:

at least one optical switch, at least one switch, at least two quantum key distribution terminals according to claim 1, and a quantum key distribution control center, wherein the at least one switch is configured to provide a classic network resource;

each of the at least two quantum key distribution terminals is connected to the quantum key distribution control center through the classic network resource;

the at least one optical switch is connected to quantum optical fiber interfaces of the at least two quantum key distribution terminals through optical fibers, which provides switches between quantum channels for the at least two quantum key distribution terminals connected thereto;

the at least one optical switch is connected to one another through an optical fiber, and each of the at least one optical switch is directly or indirectly controlled by the quantum key distribution control center;

the quantum key distribution control center is configured to transmit control signals, wherein the control signals are to control operating states of the at least two quantum key distribution terminals and the at least one optical switch; and each of the at least two quantum key distribution terminals is connected to at least one communications terminal through a key application interface.

15. The system according to claim 14, wherein each of the at least one optical switch is directly controlled by the quantum key distribution control center in the following steps:

each of the at least one optical switch is directly connected to the quantum key distribution control center through the classic network resource; and the quantum key distribution control center directly transmits the control signals to the at least one optical switch through the classic network resource, to control the at least one optical switch to switch the quantum channels.

16. The system according to claim 14, wherein each of the at least one optical switch is indirectly controlled by the quantum key distribution control center in the following steps:

each of the at least one optical switch is connected to network interfaces of the at least two quantum key distribution terminals through network cables; and the quantum key distribution control center transmits the control signals to the at least two quantum key distribution terminals connected thereto through the classic network resource, and the at least two quantum key distribution terminals transmit the control signals to the at least one optical switch connected thereto through the network cables.

* * * * *

UNITED STATES PATENT AND TRADEMARK OFFICE
CERTIFICATE OF CORRECTION

PATENT NO. : 9,577,764 B2
APPLICATION NO. : 15/025308
DATED : February 21, 2017
INVENTOR(S) : Zhao et al.

It is certified that error appears in the above-identified patent and that said Letters Patent is hereby corrected as shown below:

In the Claims

Column 14, Line 61, delete "power source" and insert -- light source board --, therefor.

Signed and Sealed this
Eleventh Day of April, 2017

Michelle K. Lee
*Director of the United States Patent and Trademark Office*